UNITED STATES PATENT OFFICE.

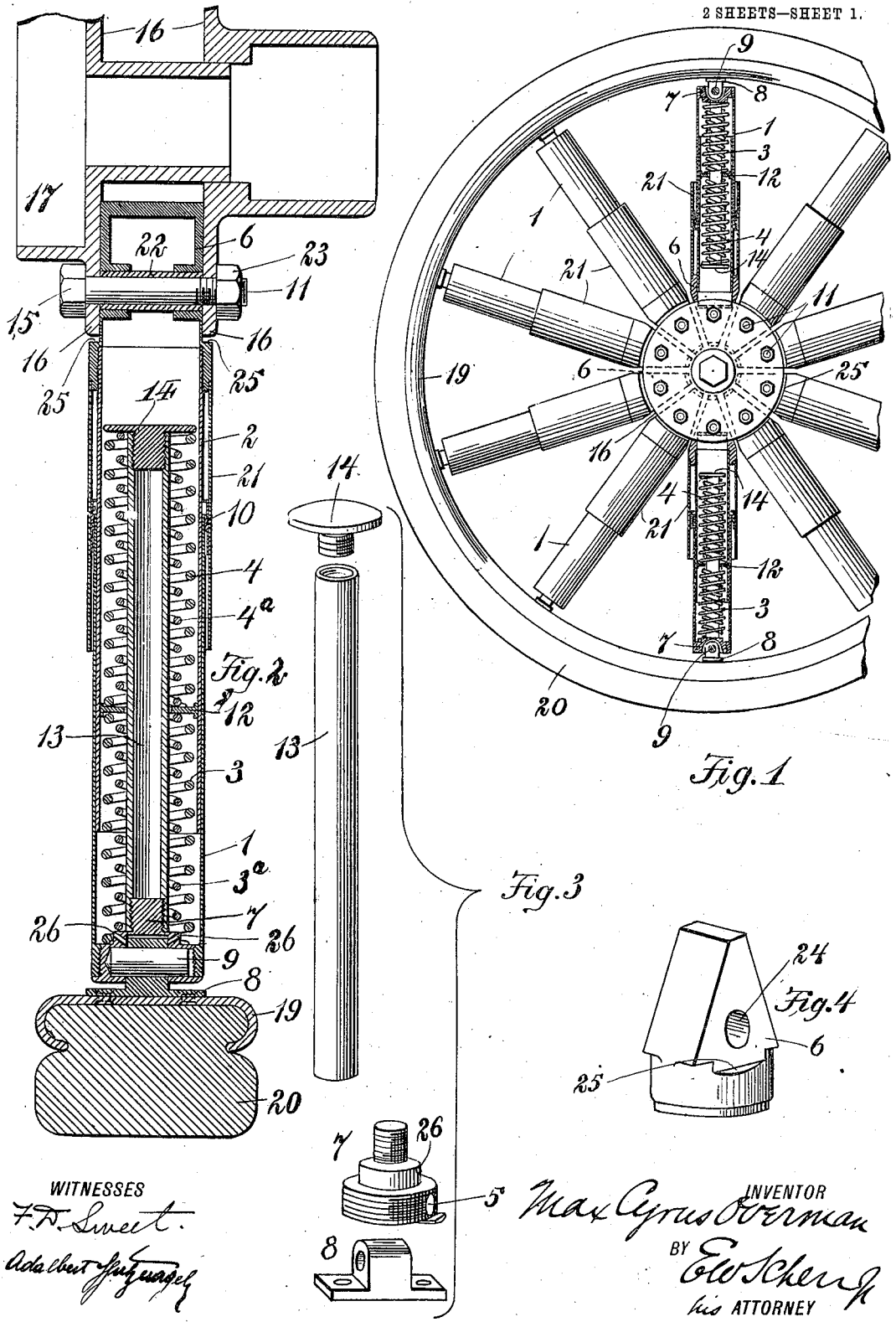

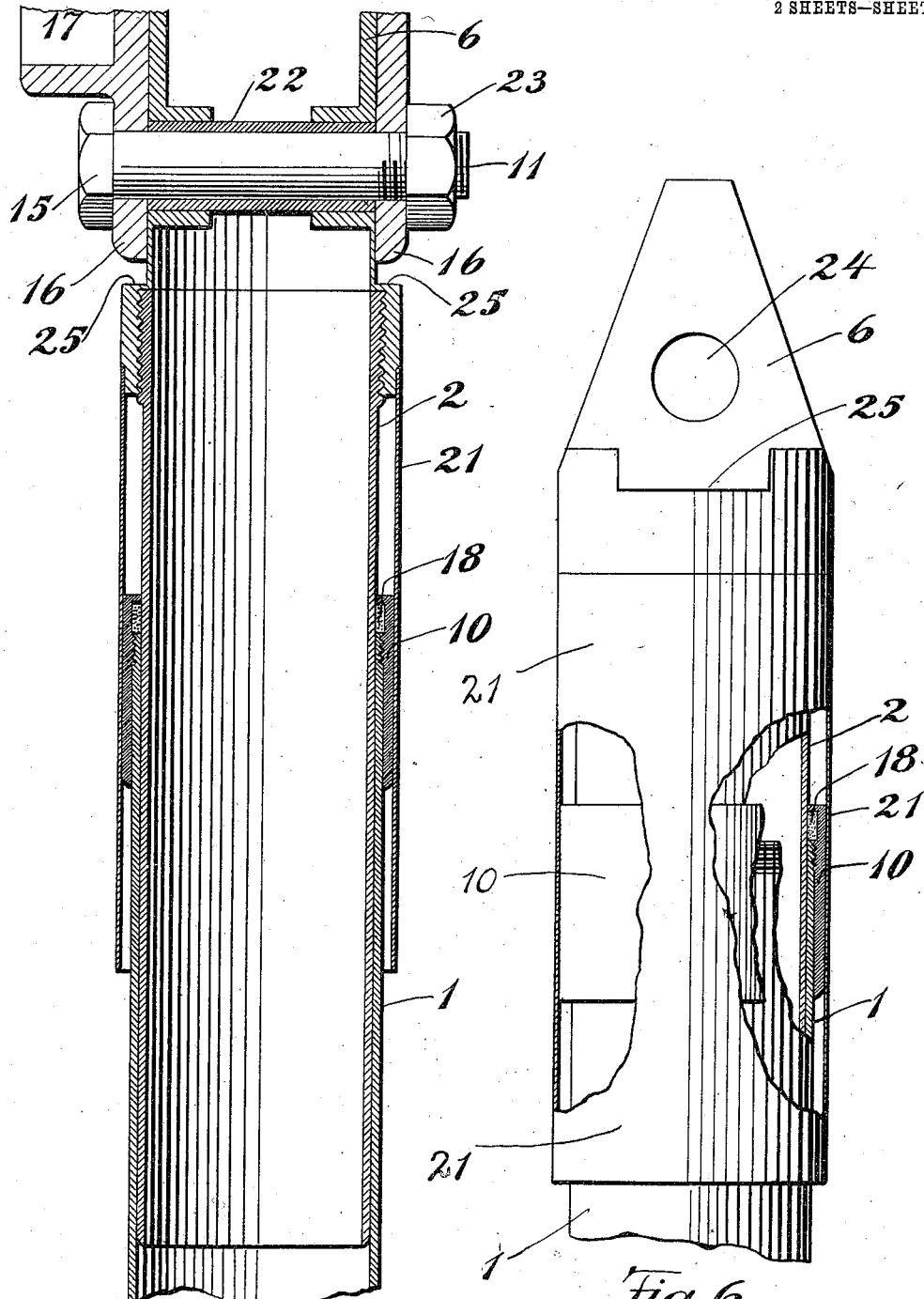

MAX C. OVERMAN, OF NEW YORK, N. Y.

RESILIENT WHEEL.

950,299. Specification of Letters Patent. Patented Feb. 22, 1910.

Application filed December 9, 1908. Serial No. 466,606.

*To all whom it may concern:*

Be it known that I, MAX C. OVERMAN, a citizen of the United States, and resident of the city, county, and State of New York, have invented certain new and useful Improvements in Resilient Wheels, of which the following is a specification.

This invention relates to an improved resilient wheel intended for use with automobiles and other vehicles and involves a combination of compression springs and other parts highly advantageous for the purpose.

In the drawings, which show a preferred form of the wheel, Figure 1 is a side elevation and partial section of the wheel; Fig. 2 is an enlarged transverse section through the hub, rim and one of the spokes; Fig. 3 is an enlarged perspective of the strut member and connected parts; Fig. 4 is an enlarged perspective of one of the hub end-members; Fig. 5 is a view on an enlarged scale of part of Fig. 2 to bring out particularly the relation of the dust tube to the spoke tubes; and Fig. 6 is a view at right angles to that in Fig. 5 of the hub-end of one of the spokes detached from the hub, said view showing various parts broken away and omitting the springs and other parts from the interior of the spoke.

I will now describe the devices of the drawings, reserving it to the claims to point out the novel features and to define the scope of the invention.

The wheel shown, comprises a series of telescoping spokes connecting a hub 17 to a rim 19. The latter is shown carrying the tire 20. Each spoke consists of a pair of tubes with their inner ends telescoped and with their outer ends respectively having pivotal connection with the hub and rim to swing in the plane of the wheel but not transversely. The tubes connected with the hub have end-members 6 and the rim-tubes have end-members 7. Each member 7 has a socket in its base receiving the knuckle of a base-plate 8 secured to the rim. A pin 9 received through an opening 5 in the side of the member 7 passes through an eye in the knuckle of the base-plate and is seated at either end in the member 7, whereby said member is pivotally connected with the base-plate. The member 7 screws into the end of the rim-tube which closes the opening 5 and prevents the pin 9 from working out.

The members 6 each have a tubular base screw-connecting with a hub-tube and an end received between hub-flanges 16, said ends tapering toward the hub-center on their sides adjacent the other ends. Sleeves 22 are rigidly secured between the flanges 16 at the spoke-intervals around the hub by bolts 11 and nuts 23. These sleeves received in openings 24 in the members 6 serve as pivots for said members to swing on.

An annular flange 12 is provided in the inner tube 2. A tubular strut 13 slides through an opening in the flange 12 and, on one side thereof, screw-connects with the nipple of the member 7 and on the other side is provided with a flange 14, comprising the outwardly extending head of a stem screw-connecting with the free end of the strut.

The flanges 12 and 14 divide the spoke interiors into three compartments. In the wheel shown, the compartments toward the hub are vacant and are short to give a maximum length to the middle and rim compartments. In fact, the length of the hub compartments is made equal to the maximum telescoping stroke which the tubes will ever be required to make, at which time the ends 14 of the struts will check against the members 6 and will save the springs in the spokes from over-compression and injury. The struts 13 being subjected to great compressive strains are preferably made tubular. The flanges 12 and 14 act as abutments for the oppositely acting compression springs 3 and 4, the former tending to force the tubes apart and the latter to telescope them. The compartments containing the springs 4 are preferably longer than those containing the springs 3, and the springs 4 when fully relaxed are longer than the springs 3 in the same condition, and have a normal compression in the set-up unloaded wheel making them predominate in strength over the springs 3. They have also a greater working range before becoming fully closed. The dominating springs 4 bind the hub and rim strongly together and give a strong wheel. Moreover, practice shows that this condition gives resiliency without unduly oscillating the load, which latter is the tendency when the springs 3 predominate. Again, it is important that the springs 4 dominate, especially in the rear wheels, because the drive comes upon them, as well as the shock of stopping or sudden changes in speed. Thus, in the drive, the hub tends to revolve ahead of the rim, carrying the spokes out of true radial position and more or less pulling apart their tubes, which is opposed by and puts under increased compression the springs 4. These springs being so important, the described greater working range has been provided for them to save them at any time from over-compression and injury. The springs 4 are likewise saved from over-compression, due to too great pulling apart of the tubes, by shoulders 25 on the hub end members 6, which check against the edge of the hub flanges and prevent the spokes from swinging too far in either direction, out of radial position. The same result may be accomplished by the contact of the tapering sides of the various members 6 with each other.

Each spring 3 and 4 is shown with an inner compression spring $3^a$ and $4^a$ respectively, with coils disposed at a different angle to prevent interference with those of the companion spring. These springs $3^a$ and $4^a$ are auxiliary in that they assist 3 and 4. Thus each helps to resist compression. Moreover, these springs, especially $4^a$, are designed to be under comparatively slight compression, in other words are such as to have a comparatively slight active effort or pressure in the set-up unloaded wheel, and consequently serve to reinforce the springs 4 in resisting compression with an increasing effort corresponding to the degree of compression, whereas on the release, their effort diminishes to practically nothing when the hub, in its return oscillation, has nearly approached its center. Consequently these springs are highly effective just when needed and do not create oscillation.

Dust excluding devices are provided comprising a tube 21 externally concentric with the inner spoke-tube 2 and extending from the base of its member 6, to provide an annular space in which the wall of the outer spoke tube 1 and an external dust-ring 10 at its mouth are snugly received and can slide during any telescoping of the tubes on each other.

18 is a ring of packing material carried on the inside of the dust-ring 10 in an annular recess therein, said ring of packing material assisting in excluding dust by bearing against the outside of the inner spoke tube 2.

Oil ducts 26 serve to admit a lubricant to the pivot 9 from the spoke interior, into which it may be inserted through a convenient opening.

Having thus described my invention, what I claim is:

1. In a resilient wheel, the combination of a hub, a rim, spokes comprising pairs of telescoping tubes having their outer ends pivotally connected with the hub and rim to pivot in the plane of the wheel, a pair of abutments one carried with each spoke-tube, said abutments being arranged to move away from each other as the spoke-tubes are telescoped farther together, and a plurality of compression springs located between the abutments in each spoke and nested inside one another, the outer springs of the nests compared with the inner springs exerting in the set-up unloaded wheel a relatively strong pressure tending to force the abutments apart, so that, on the release of such of the nests of springs as have been compressed by a shock, the inner springs of said nests have minimized tendency to oscillate the hub past the center of the wheel.

2. In a resilient wheel, the combination of a hub, a rim, spokes comprising pairs of telescoping tubes having their outer ends pivotally connected with the hub and rim to pivot in the plane of the wheel, a pair of abutments one carried with each spoke-tube, said abutments being arranged to move away from each other as the spoke-tubes are telescoped farther together, and a plurality of compression springs located between the abutments in each spoke and nested inside one another, the outer springs of the nests having a fully released length which is greater than that of the inner springs and being compressed in the set-up unloaded wheel through a greater distance than the inner springs, the compression of the inner springs being such that they have minimized tendency to oscillate the hub past the center of the wheel.

3. In a resilient wheel, the combination of a hub, a rim, spokes comprising pairs of telescoping tubes having their outer ends pivotally connected with the hub and rim to pivot in the plane of the wheel, a pair of abutments one carried with each spoke-tube, said abutments being arranged to move away from each other as the spoke-tubes are telescoped farther together, a plurality of compression springs located between the abutments in each spoke and nested inside one another, the outer springs of the nests compared with the inner springs exerting in the set-up unloaded wheel a relatively strong effort tending to force the abutments apart, so that, on the release of such of the nests of springs as have been compressed by a shock, the inner springs of said nests have minimized tendency to oscillate the hub past the center of the wheel, and second spiral springs within the spokes acting under compression in the set-up unloaded wheel on the spoke-tubes with tendency to force them apart, the first named springs, however, predominating so that the hub and rim of the wheel still have a strong tendency toward each other.

4. In a resilient wheel, the combination of a hub, a rim, spokes comprising pairs of telescoping tubes having their outer ends pivotally connected with the hub and rim to pivot in the plane of the wheel, a pair of abutments one carried with each spoke-tube, said abutments being arranged to move away from each other as the spoke-tubes are telescoped farther together, a plurality of compression springs located between the abutments in each spoke and nested inside one another, the outer springs of the nests compared with the inner springs exerting in the set-up unloaded wheel a relatively strong effort tending to force the abutments apart, so that, on the release of such of the nests of springs as have been compressed by a shock, the inner springs of said nests have minimized tendency to oscillate the hub past the center of the wheel, and second spiral springs within the spokes acting under compression in the set-up unloaded wheel on the spoke-tubes with tendency to force them apart, the first named springs having a fully released length greater than that of the second springs and having a compression in the set-up unloaded wheel which gives them a dominating strength over the second springs.

5. In a resilient wheel, the combination of a hub, a rim, spokes comprising pairs of telescoping tubes having their outer ends pivotally connected with the hub and rim to pivot in the plane of the wheel, the pivotal connecting means between the rim and each rim spoke-tube comprising a knuckle member on the rim, an end-member secured in the outer end of the spoke-tube, said member having a socket in its base receiving the knuckle and further having an opening through its side receiving a pivot pin, said pin passing through the eye of the knuckle and having its ends seated in the end-member whereby said member is pivotally connected with the knuckle member, the end-member being secured in the end of the spoke-tube with the wall of the latter closing the pin-entrance opening.

6. In a resilient wheel, the combination of a hub, a rim, spokes comprising pairs of telescoping tubes having their outer ends pivotally connected with the hub and rim to pivot in the plane of the wheel, the hub having flanges which receive pivotally supported between them the hub-ends of the hub spoke-tubes, said ends at their sides adjacent the other hub-ends tapering in the general direction of the center of the hub, the tapering sides of adjacent hub-ends being slightly separated when their spokes are in radial position so that when they are to one side of radial position, they check against each other.

7. In a resilient wheel, the combination of a hub, a rim, spokes comprising pairs of telescoping tubes with their outer ends pivotally connected with the hub and rim, an external concentric dust-tube secured dust-tight to the pivot end of the inner tube of each spoke, said dust-tube providing an annular space between itself and said inner tube within which snugly slides the mouth of the outer spoke-tube.

8. In a resilient wheel, the combination of a hub, a rim, means operatively connecting the hub and rim, the hub being able to oscillate relative to the rim, and a plurality of nests of compression springs acting upon the hub and rim to draw them together, the outer springs of the nests, compared with the inner, having said drawing-together action in the set-up unloaded wheel to a relatively strong extent so that, on the release of such of the nests of springs as have been compressed by a shock, the inner springs of said nests have minimized tendency to oscillate the hub past the center of the wheel.

Witness my hand this 7th day of December, 1908, at New York, N. Y.

MAX C. OVERMAN.

Witnesses:
WILLIAM R. BAIRD,
E. W. SCHERR, Jr.